July 11, 1933.  A. A. KOHLMILLER  1,918,111
MACHINE FOR SHARPENING RAZOR BLADES
Filed May 20, 1930  4 Sheets-Sheet 2
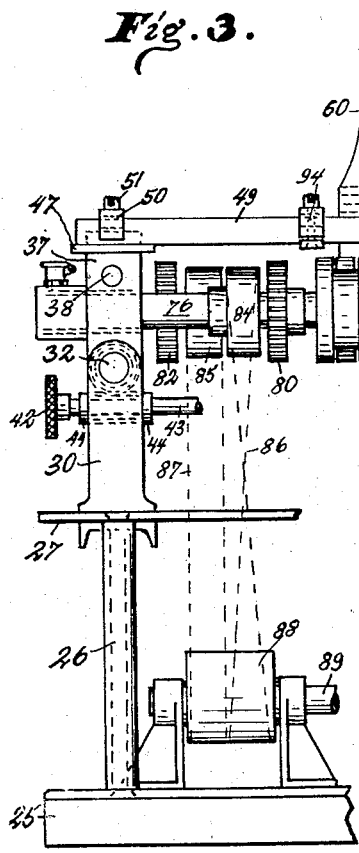
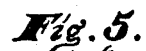
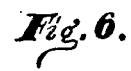
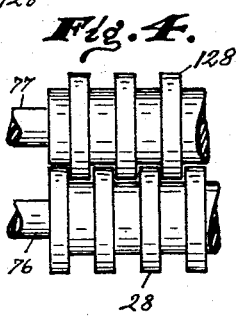
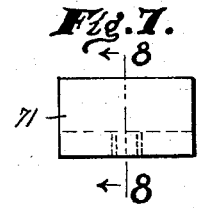
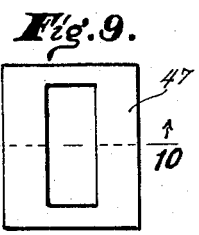
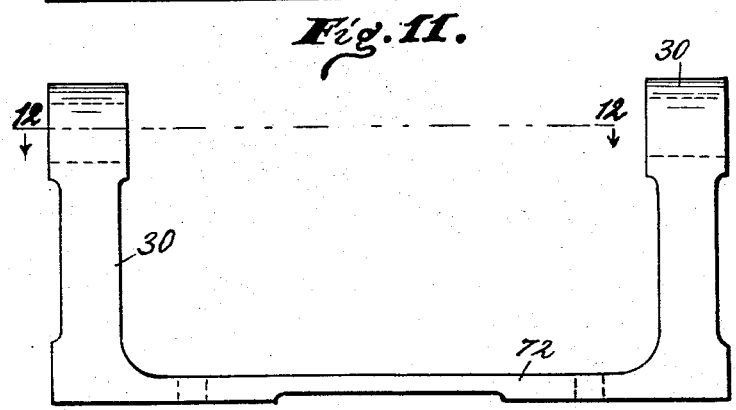
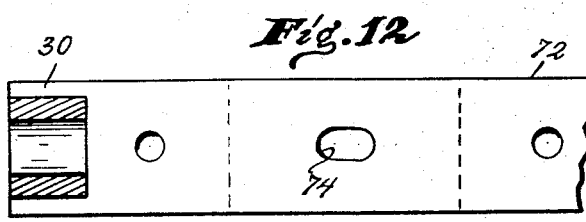
Inventor.
Alfred A. Kohlmiller
by
Lockwood & Lockwood,
His Attorneys.

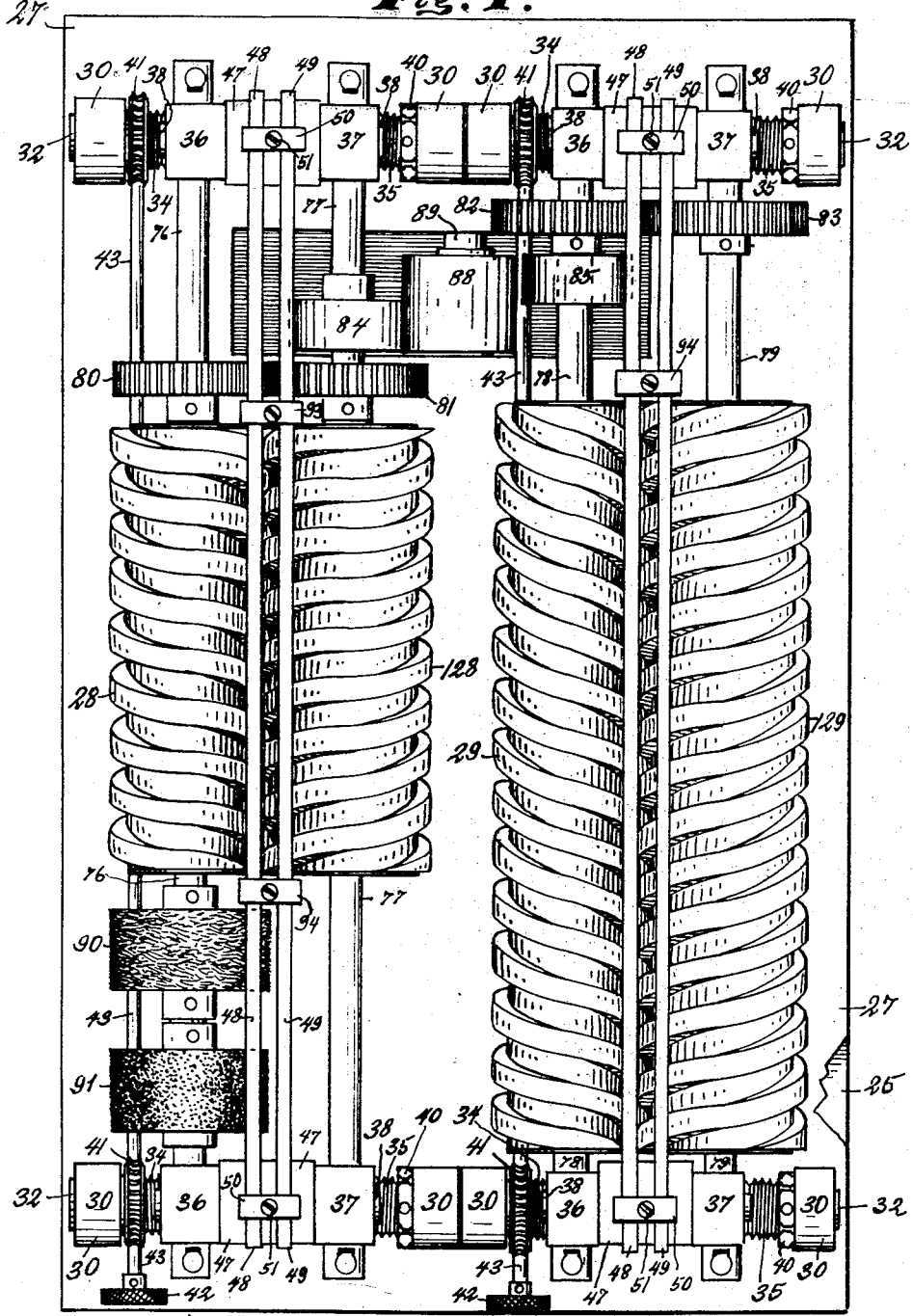

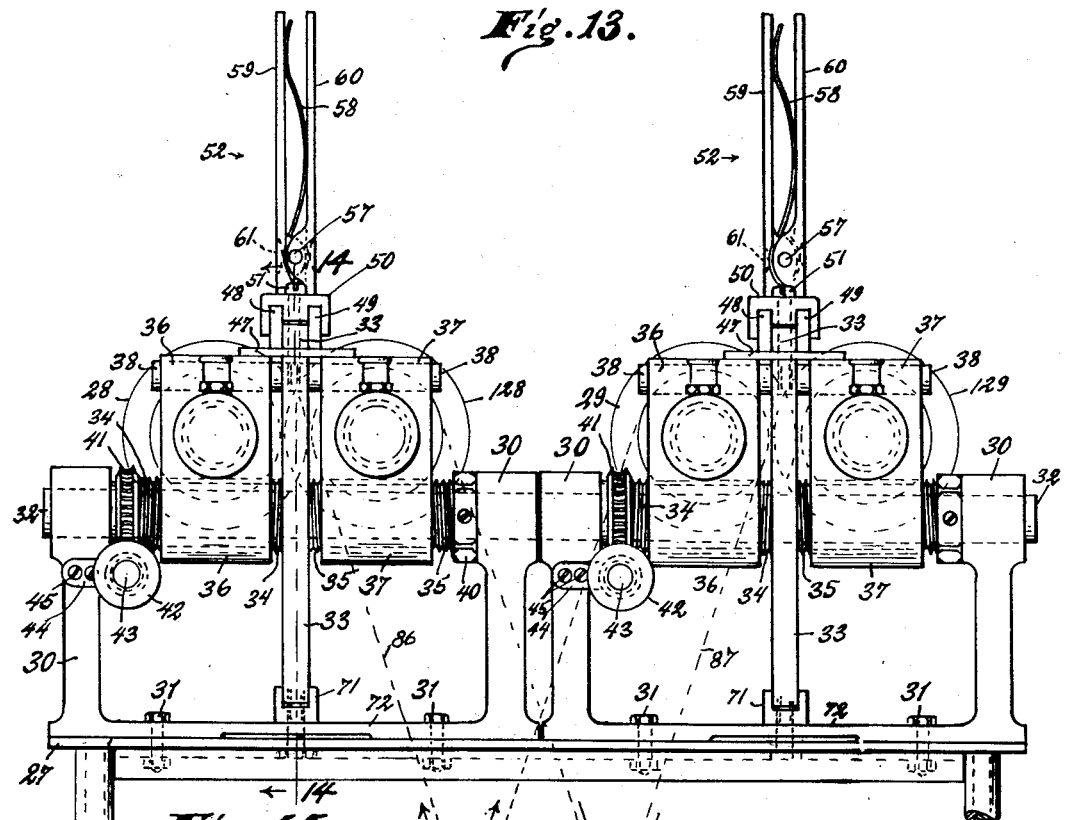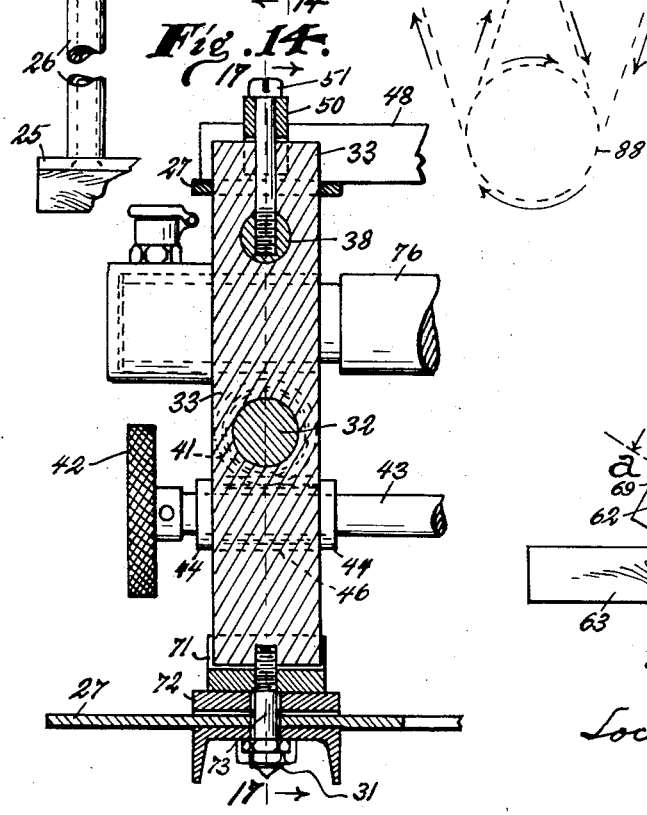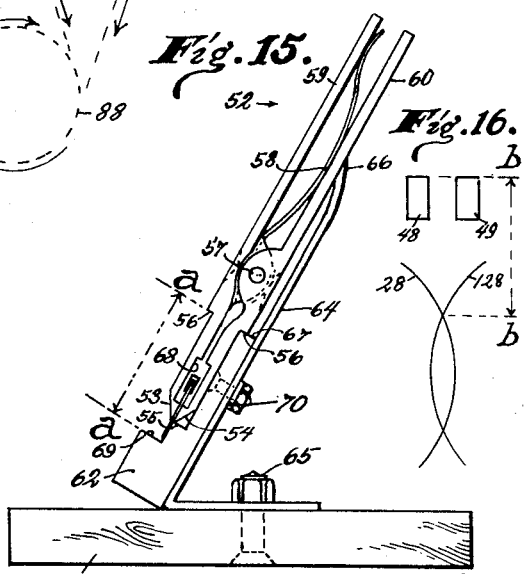

July 11, 1933.  A. A. KOHLMILLER  1,918,111
MACHINE FOR SHARPENING RAZOR BLADES
Filed May 20, 1930  4 Sheets-Sheet 4
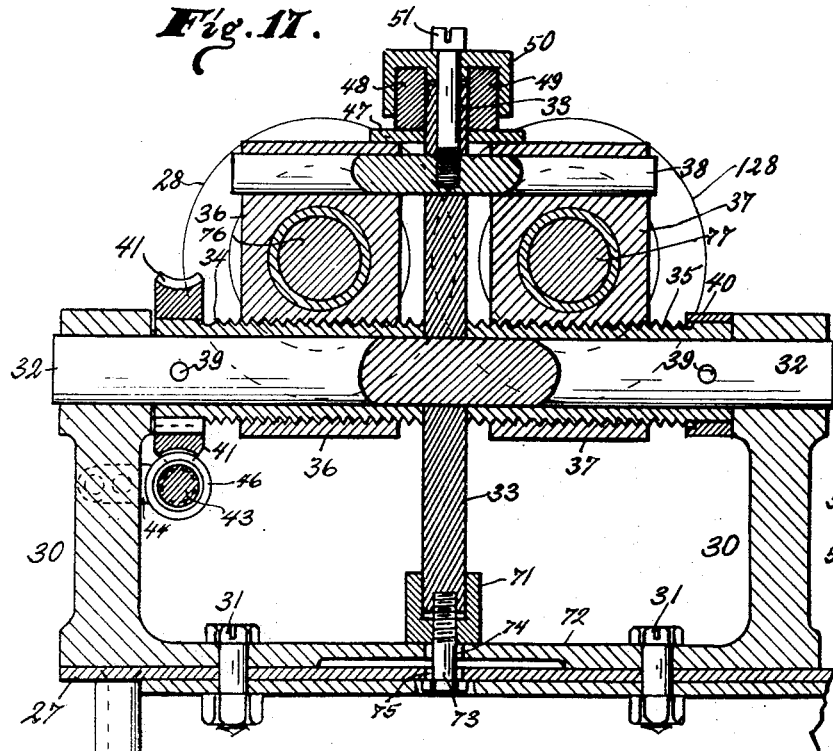
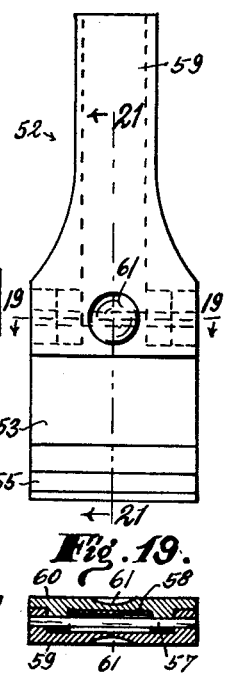
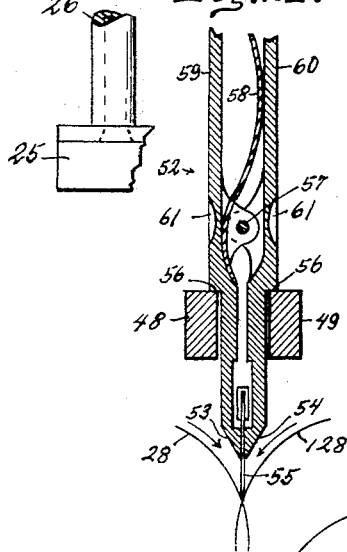
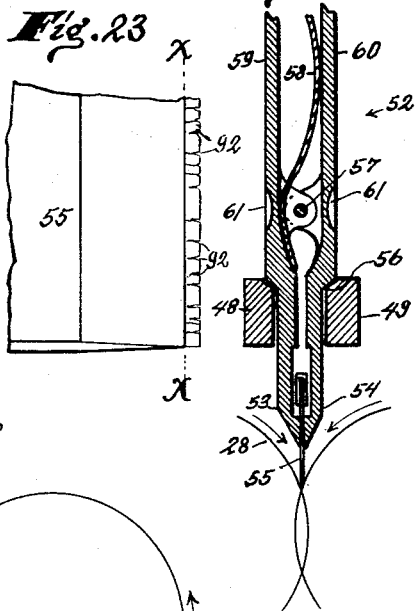
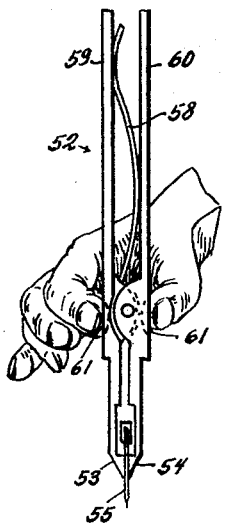
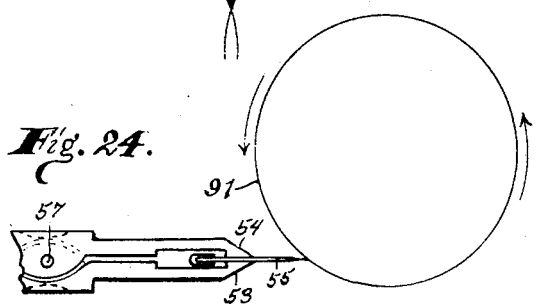
Inventor.
Alfred A. Kohlmiller.
by
Lockwood & Lockwood
His Attorneys.

Patented July 11, 1933

1,918,111

UNITED STATES PATENT OFFICE

ALFRED A. KOHLMILLER, OF LOS ANGELES, CALIFORNIA

MACHINE FOR SHARPENING RAZOR BLADES

Application filed May 20, 1930. Serial No. 453,959.

This invention relates to a machine for sharpening blades, particularly safety razor blades, and the principal object thereof is to provide a machine adapted to grind, hone and strop razor blades to a uniform sharpness in a minimized amount of time without unnecessary grinding or labor. To that end I provide a machine with sharpening rolls above which a support is mounted that is adapted to loosely support individual blade holders that hold their respective blades in contact with the rolls until they are ground, honed or stropped to a predetermined sharpness, after which the blade holders are manually removed from the machine. In other words, the support and blade holders are arranged to permit the razor blades to move downward a predetermined distance into grinding, honing or stropping contact with the rolls, and they are suspended in a relatively loose position while being sharpened.

Another object of the invention is to provide a machine with sharpening rolls having bearing blocks in pairs that can be easily and simultaneously adjusted toward or from one another while the machine is in operation to move the rolls so their peripheral surfaces will contact properly with the edges of the razor blades to sharpen them to a predetermined sharpness. To that end I provide means for mounting the bearing blocks in pairs so they can first be adjusted separately to move their respective rolls into parallel alignment, after which all the bearings of a pair of rolls are adjusted simultaneously by a worm shaft to move the rolls toward or from one another to properly contact with the edges of the razor blades.

Another object of the invention is to provide a machine for sharpening razor blades having a support so constructed and arranged that the individual blade holders mounted thereon can rock or move sidewise to properly and automatically adjust their respective blades to the sharpening rolls, and also so the blade holders can be manually moved on the supports with the edges of the blades engaging the rolls.

Another object of the invention is to provide a machine adapted to operate with individual blade holders so that each blade can be sharpened independently of the other blades, it being understood that a large number of blades can be operated on at the same time by the machine.

Another object of the invention is to provide the blade sharpening machine with a pair of buffer rolls for wiping and polishing the individual blades and removing their raveled or uneven edges before they are individually placed on the stropping rolls for a final sharpening.

A feature of the invention is shown in the novel construction, combination and arrangement of the parts of the gauge, blade holder and support, whereby they coact to arrange each blade in proper position to engage the sharpening rolls of the machine to be properly sharpened.

Another feature of invention is shown in the novel construction and arrangement of parts for supporting and adjusting the bearing blocks, whereby the rolls are easily adjusted toward or from one another while the machine is in operation; and also whereby the pairs of rolls are held stable from sidewise movement or excessive vibration while in operation.

Another feature of invention is shown in the construction of the blade holder supports and the means for centralizing them above their respective pairs of rolls.

Features of invention are shown in the construction, combination and arrangement of parts in the individual blade holders.

Another feature of invention is shown in the novel construction of the gauge, whereby it can be used with the individual blade holders in arranging the blades in proper position relative to the sharpening rolls; and by means of which the work of gauging the blade is accomplished expeditiously, thereby saving considerable time and labor.

Other objects, advantages and features of invention may appear from the accompanying drawings, the subjoined detailed description and the appended claims.

The accompanying drawings illustrate the invention:

Fig. 1 is a broken plan view of a razor blade sharpening machine constructed in accordance with this invention showing two pairs of sharpening rolls with meshing helices. Fig. 2 is a semidiagrammatic side view of the machine showing a number of individual blade holders arranged on the stropping rolls and indicating by arrows that the holders are manually moved from the end c to d with the edges of the razor blades in contact with the rolls. Fig. 3 is an enlarged fragmental side elevation of an end portion of the machine showing a modified form of sharpening rolls and one individual blade holder in position for its blade to engage them. Fig. 4 is a fragmental plan view of the pair of sharpening rolls shown in Fig. 3. Fig. 5 is a side view of one of the vertical centering bars. Fig. 6 is a central vertical section on line 6—6 of Fig. 5. Fig. 7 is a side view of a stabilizer for holding the lower end of the centering bars in a relatively fixed position. Fig. 8 is a cross section on line 8—8 of Fig. 7. Fig. 9 is a plan view of one of the collars used in the blade holder supports. Fig. 10 is a section on the line 10—10 of Fig. 9. Fig. 11 is a side view of a pair of twin posts employed in supporting the sharpening rolls and blade supports. Fig. 12 is a fragmental section on line 12—12 of Fig. 11. Fig. 13 is a fragmental end view of the machine drawn to the same scale as Fig. 1, showing blade holders mounted on the blade supports, and also diagrammatically indicating the means for driving the pairs of rolls.

Fig. 14 is an enlarged fragmental vertical section on line 14—14 of Fig. 13, showing the means for securing the vehicle centering bars in relatively fixed positions, there being two bars for each pair of rolls.

Fig. 15 is a side view of a gauge with a blade holder arranged thereon and diagrammatically illustrating by line a—a the distance from the edge of a blade to the shoulder of a blade holder, which distance is slightly greater than the distance b—b in Fig. 16. Fig. 16 is a diagrammatic view of a pair of rolls and the blade holder support showing that the distance from the apex of the upper tangential angle between the rolls to the top of the blade holder support is slightly less than the distance a—a in Fig. 15. Fig. 17 is a fragmental section on line 17—17 of Fig. 14 showing a detail of the means for mounting and adjusting the bearing blocks and supporting the rolls and blade holder support. Fig. 18 is a side view of one of the blade holders. Fig. 19 is a section on the line 19—19 of Fig. 18, showing the hinged connection of the jaws and also showing oppositely arranged recesses adjacent the hinge by which the holder is handled. Fig. 20 is an end view of the blade holder showing how it is handled after it has been lifted off the gauge with a razor blade arranged in place.

Fig. 21 is a vertical section on line 21—21 of Fig. 18 diagrammatically showing a pair of rolls engaging the edge of the razor blade in the blade holder loosely mounted on the blade holder support.

Fig. 22 is a view analogous to Fig. 21, showing the shoulders of the blade holder rounded and arranged in a rounded seat on the bed plates so that the blade holder can rock to automatically arrange the edge of the razor blade in proper position relative to a pair of rolls, and also diagrammatically showing the edge of the razor blade engaging a pair of rolls. Fig. 23 is a greatly enlarged fragmental view of a portion of a razor blade showing an exaggerated feathered edge with grinding wheel works extending back to the line x—x to which the edge is buffed off before the blade is placed on the stropping rolls for a final sharpening. Fig. 24 is a semi-diagrammatic view of one of the buffer rolls engaging a razor blade to buff off the feathered edge before it is placed on the stropping rolls.

The machine includes a base 25 having uprights 26 that support a platform 27 on which a major portion of the machine is mounted.

The platform 27 can be large enough to support as many pairs of sharpening rolls as may be desired. For the purpose of illustration I show a machine with two pairs of sharpening rolls, indicated as grinding rolls 28–128 and honing or stropping rolls 29–129. These pairs of rolls are supported by pairs of twin posts 30 that are secured to the platform 27 by bolts 31, as best indicated in Fig. 13.

Rotatably mounted in the upper ends of the posts 30 are bearing supporting rods 32 that extend through vertical centering bars 33 that are arranged at opposite ends of the machine and centrally between their respective pairs of posts.

Loosely mounted on the rods 32 are right and left hand threaded sleeves 34–35 on which are adjustably mounted pairs of bearing blocks 36–37 that are stabilized at their upper ends by rods 38 that also extend through the centering bars 33 adjacent their upper ends. In other words the bearings 36–37 are adjustable on the sleeves 34–35 and slide on the rods 38.

The pairs of rolls 28–128 and 29–129 are mounted on the respective shafts 76, 77, 78 and 79 that have their ends journaled into the bearing blocks 36–37 between the sleeves 34–35 and the rods 38 so that they are substantially supported and prevented from excessive vibration when in use.

After the roll shafts are journaled into the bearing blocks 36–37 the sleeves 34, 35 can be manually rotated on the adjusting shafts to move the roll shafts and their respective pairs of rolls into parallel alignment so that their peripheral surfaces are substantially parallel, after which the sleeves are secured to the rod 32 by pins 39, so that when the rods 32 are turned either by the nuts 40 or the worm gear 41 the bearing blocks will all be automatically adjusted toward or from the centering bars 33 or toward or from a fixed vertical plane between the respective rolls.

The adjustment of each pair of rolls, after they are properly aligned, is preferably accomplished by means of a knurled nut 42 that is secured to the outer end of a worm shaft 43 mounted in brackets 44 that are secured to the posts 30 by screws 45, and in the brackets are mounted worms 46 that engage the gears 41 so that when the nuts 42 are turned one way or the other they will automatically move all of the bearing blocks of their respective pairs of rolls toward or from one another and at substantially the same time and distance.

The centering bars 33 are extended upward through the collars 47 that are slidably mounted on the upper surfaces of the bearing blocks 36–37, and mounted on these collars and arranged on opposite sides of the upper ends of the centering bars 33 are spaced blade holder carrier bars 48–49 that are securely held in place by cleats 50 that are attached to the centering bars and also to the guide rods 38 by screws 51, as best shown in Fig. 17.

The carrier bars 48 and 49 are arranged a predetermined distance apart and above the apex of the upper tangential angle between each pair of rolls, which distance is indicated by the line b—b in Fig. 16, it being understood that this distance can be increased or decreased as may be desired. That is, by moving the rolls of each pair closer together by means of the worm drive the distance will be decreased and vice versa.

The distance b—b in Fig. 16 is preferably a little less than the distance a—a shown in Fig. 15 so that the edges of the razor blades will fully engage the rolls when first placed on the machine and permit the shoulders of their respective holders to lightly engage or rest on the upper surface of the carrier bars. In other words, the edges of the razor blades hold the holders very lightly engaged with the carrier bars until the blades are ground or honed to a predetermined sharpness. Then when stropped the shoulders of the holder engage the support and prevent further downward movement of the blades.

The individual razor blade holders 52 are constructed as best shown in Figs. 15 and 18 to 22, inclusive. These holders are in the form of a pair of tongs having oppositely arranged jaws 53 and 54 that are adapted to engage and detachably hold a razor blade 55.

These jaws are arranged below the shoulders 56, and are connected by the pivot pin 57. The jaws are held engaged with one another by means of a leaf spring 58 arranged between the arms 59 and 60.

On opposite sides of the pivot pin 57 the arms 59–60 are recessed at 61 to form finger holds by which the blade holders are preferably handled after the razor blades 55 have been placed in them and properly gauged by the gauge 62 so that the blades will not be loosened or displaced after they are secured in proper place.

The gauge consists of a base 63 on which an inclined upright 64 is secured by a bolt 65, the upright having a curved upper end 66 that forms a rest for one of the arms of the blade holders when they are placed on the gauge. The gauge also is provided with a shoulder 67 that is adapted to engage the shoulders 56 of the blade holders when they are placed on the gauge and the jaws of the holders are recessed at 68 to form a clearance for the blades so that they can move up or down between the jaws to engage their lower edges with the shoulder 69 of the gauge.

The gauge block 62 is secured to the support 64 by a bolt 70.

If desired the shoulder 56 of the blade holder can be rounded as shown in Fig. 22, and the adjacent upper edges of the bed plates 48 and 49 can also be rounded as shown, so that the blade holders can have a slight sidewise self centering movement to automatically engage their respective blades in a proper position on the rolls.

The carrier bars are centralized between and above the rolls by the centering bars 33 which are supported on the rod 32 and which have their lower ends stabilized by the stabilizers 71 that are arranged to engage the lower ends of the bars. The stabilizers are secured to the base 72, that is integral with the twin post 30, by means of screws 73 that are extended upward through slots 74, 75 in the platform into the stabilizers, the slots being provided to afford slight side adjustment of the rods 32 when they are being centralized.

The pairs of rolls 28–128 and 29–129 are mounted on the respective shafts 76, 77, 78 and 79 that, as previously stated, have their ends journaled into the bearing blocks 36–37, and these pairs of rolls are driven in timed relationship with one another by means of gears 80, 81 on the shafts 76, 77 and gears 82, 83 on the shafts 78 and 79.

The adjacent shafts 77, 78 carry pulleys 84, 85 that are driven through belts 86, 87 by a pulley 88 on a shaft 89 that is in turn driven by a motor, not shown, but well understood in the art. In other words, when the shaft 89 is driven each of the pairs of rolls will be rotated toward one another, to engage the razor blades, the grinding rolls moving up against the edge of the razor blade and the stropping rolls moving downwardly away from the edge of the blades.

Also mounted on the shaft 76 are two buffer rolls 90–91 that are utilized for wiping off the edges of the razor blades after they have been ground by the rolls 28–128 and before they are placed in the honing or stropping rolls 29–129.

As is well known in the art, razor blades after they are ground have an exceedingly fine raveled edge, which is greatly exaggerated as indicated in Fig. 23.

The buffer 90, which is preferably formed of fibrous material, is used to wipe off the feathery edge of the ground blades, after which their edges are brought into engagement with the periphery of another buffer 91 and preferably tangentially thereto, as indicated in Fig. 24, so that all of the feathery edge of each blade is broken off to a straight edge indicated by the line $x$—$x$ in Fig. 23.

In other words I buff off the edges of the ground blades that are too thin and feathery, as indicated by the nicks or cracks 92 in Fig. 23. Then with the blades still held in their individual holders I place them on the rolls 29–129 for a final sharpening or stropping and preferably the blades are then manually slid from end to end of the rolls so that each individual blade will contact with the entire peripheral surface of the stropping rolls. That is, the blade holders, after their blades have been ground and their raveled edges buffed off, can be placed on the support adjacent one end of the stropping rolls, as at the end $c$ in Fig. 2, and then manually moved in gradual steps the width of the blades on toward the end $d$, which gradual stepped movement will make room on the stropping rolls for succeeding holders. If desired stops 93, 94 can be arranged on the bed plates 48, 49 to limit the movement of the blade holder.

In operation the machine is driven as described and razor blades to be sharpened are first arranged between the jaws of individual holders and then placed on the gauge 62 to properly arrange the blades relatively to the grinding rolls; and when so gauged the blades are arranged so that the distance $a$—$a$ from their edges to the shoulders of the holders, as indicated in Fig. 15, is slightly greater than the distance $b$—$b$, Fig. 16, which corresponds to the distance from the apex of the upper tangential angle between the rolls to the top of the bed plate.

After the blades are gauged they are first placed in the grinding rolls 28–128 to grind them to a raveled edge, which is then broken away by the buffer rolls 90–91.

Then the blades are placed on the honing or stropping rolls 29–129 for a final sharpening.

As previously stated the blade holders can be manually reciprocated endwise of the sharpening rolls to whet the blades. Also, as previously stated, the rolls of each pair can be moved toward or from one another while being driven to properly engage them with the razor blades.

I claim as my invention:

1. In a machine for sharpening razor blades the combination with a pair of meshing sharpening rolls, bearing blocks in which the ends of said rolls are journaled, threaded sleeves extending through said blocks for adjusting them independently of one another to move said rolls into parallel alignment, supporting rods extending through said sleeves, pairs of twin posts for supporting said rods, of a support including a pair of spaced carrier bars arranged above said rolls, individual blade holders adapted to be loosely mounted on said bars so that the edges of their razor blades will properly engage the rolls by gravity, means for driving said rolls to sharpen said blades.

2. A machine for sharpening razor blades including a platform, twin posts secured thereon, bearing supporting rods mounted in the upper ends of said posts, threaded sleeves secured to said rods, bearing blocks mounted on said sleeves, guide rods extending through the upper ends of said blocks, rolls having their ends journaled in said block between said sleeve and guide rod, and means for driving said rolls, and a manually operated worm drive for simultaneously rotating all of said sleeves to move said rolls toward or from one another while being driven.

3. A machine for sharpening razor blades including a platform, twin posts secured thereon, bearing supporting rods mounted in the upper ends of said posts, centering bars loosely mounted on said rods, right and left hand threaded sleeves secured to said rods and arranged on opposite sides of said bars, bearing blocks mounted on said sleeves, guide rods extending through the upper ends of said bars and blocks, pairs of rolls having their ends journaled into said blocks between said sleeves and guide rods, and means for securing the lower ends of said centering bars to said platform.

4. A machine for sharpennig razor blades including a platform, twin posts secured thereon, bearing supporting rods mounted in the upper end of said posts, vertical centering bars loosely mounted on said rods, right and left hand threaded sleeves secured to said supporting rods and arranged on opposite sides of said bars, bearing blocks arranged in pairs at opposite ends of said platform and mounted on said sleeves, guide rods extending through the upper ends of said bars and blocks, pairs of rolls having their ends journaled into said blocks between said sleeves and guide rods, means for rotating said rolls, and other means for rotating said supporting rods to move the bearing blocks of each pair toward or from the centering bars to space said rolls a proper distance apart to engage the edges of the razor blades longitudinally.

5. A machine for sharpening razor blades including a platform, twin posts secured thereon, bearing supporting rods mounted in the upper ends of said posts, vertical centering bars loosely mounted on said rods, stabilizers engaging the lower ends of said bars, right and left hand threaded sleeves secured to said rods and arranged on opposite sides of said bars, bearing blocks mounted on said sleeves, guide rods extending through the upper ends of said bars and blocks, pairs of rolls having their ends journaled into said blocks between said sleeves and rods, means for rotating said rolls, and means for rotating said rods to adjust said rolls toward or from one another.

6. The combination set forth in claim 5 and a razor blade support connected to said centering bars for the purpose specified.

7. The combination set forth in claim 5 and, collars loosely mounted on said blocks and extended over the upper ends of said bars, bed plates supported on said collars that are arranged on opposite sides of said bars, cleats extended over said bars and plates, and screws for securing said cleats in place, said screws extending downward through said bars into said guide rods.

8. The combination set forth in claim 5, and a blade support including parallel carrier bars secured to said centering bars, and individual blade holders adapted to be loosely mounted on said support so that their razor blades will engage said rolls.

9. A machine for sharpening razor blades including a pair of sharpening rolls parallel with each other, a similar bearing block supporting each end of each roll and a pair of bearing blocks at each end of the rolls having internally and reversely threaded holes through them in alinement with each other, an externally threaded sleeve extending through the holes in each pair of bearing blocks, a rotary shaft extending through and secured to the pair of sleeves at each end of said rolls, the sleeves on each shaft being reversely threaded, and means for simultaneously and similarly turning the shafts at both ends of said pair of rolls, whereby the rolls will be uniformly adjusted throughout their length in one operation.

In witness whereof, I have hereunto affixed my signature.

ALFRED A. KOHLMILLER.